(12) United States Patent
DiDomizio et al.

(10) Patent No.: US 6,523,028 B1
(45) Date of Patent: Feb. 18, 2003

(54) METHOD AND SYSTEM FOR UNIVERSAL QUERYING OF DISTRIBUTED DATABASES

(75) Inventors: Virginia Ann DiDomizio, Latham, NY (US); Walter Vincent Dixon, III, Delanson, NY (US); Scott D. Epter, Rhinebeck, NY (US); Louis John Hoebel, Burnt Hills, NY (US); Osman Rifki Oksoy, Clifton Park, NY (US); Jonathan Peter Stillman, Ballston Spa, NY (US); Jennifer M. Corman, Schenectady, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/452,849

(22) Filed: Dec. 2, 1999

Related U.S. Application Data

(60) Provisional application No. 60/110,787, filed on Dec. 3, 1998.

(51) Int. Cl.[7] .............................. G06F 17/30; A45T 9/11
(52) U.S. Cl. .......................................................... 707/5
(58) Field of Search ................................... 707/1–5, 10

(56) References Cited

U.S. PATENT DOCUMENTS

| | | | | |
|---|---|---|---|---|
| 5,410,692 A | * | 4/1995 | Torres ............................. | 707/3 |
| 5,600,831 A | * | 2/1997 | Levy et al. ..................... | 707/2 |
| 5,671,436 A | * | 9/1997 | Morris et al. .................. | 707/10 |
| 5,721,900 A | * | 2/1998 | Banning et al. ................ | 707/4 |
| 5,768,578 A | * | 6/1998 | Kirk et al. ..................... | 707/100 |
| 5,797,001 A | * | 8/1998 | Augenbraun et al. .......... | 707/9 |
| 5,893,087 A | * | 4/1999 | Wlaschin et al. ............... | 707/3 |
| 5,926,811 A | * | 7/1999 | Miller et al. ................... | 707/5 |
| 5,933,822 A | * | 8/1999 | Braden-Harder et al. ...... | 707/5 |
| 5,953,718 A | * | 9/1999 | Wical ............................. | 707/5 |
| 5,956,711 A | * | 9/1999 | Sullivan et al. ................ | 707/6 |
| 5,987,457 A | * | 11/1999 | Ballard ........................... | 707/5 |
| 5,995,959 A | * | 11/1999 | Friedman et al. .............. | 707/3 |
| 5,999,940 A | * | 12/1999 | Ranger .......................... | 707/103 |
| 6,023,694 A | * | 2/2000 | Kouchi et al. ................. | 707/2 |
| 6,028,605 A | * | 2/2000 | Conrad et al. ............. | 345/354 |
| 6,101,492 A | * | 8/2000 | Jacquemin et al. ............ | 707/3 |
| 6,154,213 A | * | 11/2000 | Rennison et al. ........... | 345/356 |
| 6,169,986 B1 | * | 1/2001 | Bowman et al. ............... | 707/5 |
| 6,175,829 B1 | * | 1/2001 | Li et al. ......................... | 707/3 |
| 6,175,836 B1 | * | 1/2001 | Aldred ........................ | 707/103 |
| 6,411,950 B1 | * | 6/2002 | Moricz et al. ................. | 707/3 |

OTHER PUBLICATIONS

Eguchi et al "Adaptive and incremental query expansion for cluster–based browsing", IEEE 1996 pp. 25–34.*
Bodorik et al "Deciding to correct distributed query processing", IEEE 1992, pp. 253–256.*
Qui et al "Concept based query expansion", ACM 1993, pp. 160–169.*
Kekalainen et al "The impact of query expansion on retrieval performance", ACM 1998, pp. 130–137.*

* cited by examiner

Primary Examiner—Safet Metjahic
Assistant Examiner—Uyen Le
(74) Attorney, Agent, or Firm—Marsh Fischmann & Breyfogle LLP

(57) ABSTRACT

A method and system for accessing information or data from distributed databases is disclosed. Generally, the method includes the steps of receiving an unstructured query from a user, generalizing the query to expand the query, receiving from the user selected terms of the expanded query, searching a directory for database tables and/or attributes matching the selected terms, and generating a pictorial query using database tables suggested as relevant by the search. Thereafter, an SQL query may be generated to retrieve the relevant data from the actual distributed databases.

13 Claims, 13 Drawing Sheets

METHOD AND SYSTEM FOR UNIVERSAL QUERYING OF DISTRIBUTED DATABASES

RELATED APPLICATION

This application claims the priority benefit of U.S. Provisional Application No. 60/110,787, filed on Dec. 3, 1998, entitled "UNIVERSAL QUERYING OF DISTRIBUTED DATABASES," the entire disclosure of which is incorporated by reference in its entirety herein.

FIELD OF THE INVENTION

The present invention generally relates to a system and method for searching target databases, and in particular, to a system and method for universal querying of distributed databases.

BACKGROUND OF THE INVENTION

Numerous independently owned collections of data are being created and maintained all over the world. The number of active and legacy data sources almost guarantees that part or all of a query can be answered using one of these countless databases. However, there exist several intermediate steps between posing a query and receiving an answer that make the task of querying others' databases almost impossible for the average user. First, the user must locate a relevant data source. Then he or she must gain access to the source, pose the query using table names and attribute names from that target database, and finally must decide which of the returned data, if any, is relevant to the query. Users' queries must be formatted correctly, either using structured query language (SQL) code, or using formatted blocks of code (i.e., code generated by a back-end process based on user-filled selection boxes and text fields).

While this list of steps is formidable, the process of querying is even more difficult if multiple databases must be consulted to obtain a complete answer. Not only must the above steps be executed, but the data from different sources must be joined; and, if there are discrepancies, the user must decide which source is more reliable. In integrating the data, users must first understand elements of each database's schema so that corresponding fields between databases can be identified. Even once corresponding fields have been located, the user must consider both the relative accuracy of the sources and the timeliness of the data contained within the sources. For example, data in a five (5) year old database would obviously be less relevant to data in a current database if a Department of Defense (DoD) member is querying about current troop movements.

There are even more basic problems standing between the user's query and an answering data set. Databases are created with a particular task in mind. The database may be tailored for ease of asking particular types of queries, for ease of storing new data, or for storing groups of attributes as an object. Designing databases for specific purposes allows data to be stored and retrieved efficiently for that particular task and possibly a few related tasks. However, this makes it nearly impossible to retrieve information for other unrelated tasks. In looking at the task of querying from this perspective, it can be seen that the most fundamental querying problem is that groupings of objects that make sense in one database representation, make it difficult to regroup attributes to form objects meaningful to a query unrelated to the database's specific purpose. For example, consider the database tables below which have been excerpted from a hypothetical company's relational database:

| Employee | Acquisition Agent |
|---|---|
| Employee_ID | Occupation_Code |
| Social_Sec_# | Salary_Band_A |
| Salary | Salary_Band_B |
| Title | Band_A_Max_PO |

Tables and attributes from a hypothetical company database. The "Employee" table has key Employee_ID and attribute Social_Sec_#, Salary, and Title. The "Acquisition Agent" table has key Occupation_Code and attributes Salary_Band_A, Salary_Band_B, and Band_A_Max_PO.

A division of this hypothetical company has a database that keeps track of its employees. The database has a table, "Employee," that contains basic information such as name, social security number, salary, and job title. The key in this table is Employee_ID. The database also has individual tables relating to each job title within the company. These tables note the occupation's salary ranges (e.g., Salary_Band_A) and the specific duties at each salary level (e.g., Band_A_Max_PO). For example, for an "Acquisition_Agent," the salary bands are A, B, etc., and the maximum amount that an individual in salary band A may purchase is Band_A_Max_PO. This table's key is Occupation_Code. A reasonable query from another division of the company could be "Return the individuals who can purchase more than 5000 units of product X." Given the above two tables from the database, we can see that the query will be difficult to execute. First, the individual asking the query would have to know that Acquisition_Agent and Buyer were synonymous. Next, a join on salary would need to be executed, but there is no common key. Finally, math would have to be performed to translate between the maximum purchase order allowed (Band_A_Max_PO) and the number of units of X a specific buyer could purchase. This seemingly simple query requires a great deal of database-specific knowledge.

From the above discussion it is clear that there can be a number of issues encountered in trying to retrieve data from an unfamiliar source or sources. There is the initial task of locating relevant data sources. Even once this has been accomplished, the problem of answering the query becomes no easier. Issues range from the banal, but nontrivial, task of gaining access privileges, to the more theoretical and complex tasks of regrouping of attributes to form real-world entities (i.e., the attributes within a table must be understood as representations of actual physical objects). Several potential obstacles are discussed below.

The first potential obstacle concerns gaining access to the relevant data source. This involves being allowed to read the database schema and the data contained within the database. Additionally, it may require the ability to store intermediate tables. When a large, multi-step query with several joins or cross products is carried out, the intermediate tables generated need to be temporarily stored. If systems accessing the database are remote, it is clearly impractical to transmit these larger data sets to the querying machine. Thus, some local write space may be desired.

A second potential obstacle concerns the fact that each database in the system may have been designed for efficiency for a system-specific task. Databases are created to fit within larger systems. These systems have certain storage and retrieval requirements, as well as baseline assumptions about data format. No matter how general a database schema is developed, the schema must operate within the system and data requirements. This necessarily means there are queries the system will have difficulty answering.

A third potential problem is that poorly labeled tables and attributes can make it impossible to determine the real-world object being represented. Examples of table names extracted from actual DoD data sources include: $UD01, VNNZ, SYFA, and WUC1. Examples of attribute names extracted from the same DoD source include: SC, TCN, FROM_PPC1, and PRIME. Without the aid of documentation or the original database designers, it is impossible to know what physical objects are represented by these tables. Thus, data corresponding to a user's query is forever lost because a user or an automated system will be unable to identify all relevant data.

The fourth potential problem in trying to answer a query is that documentation is typically scarce and may not be any less cryptic than the database objects themselves. Additionally, original database designers may have forgotten what the objects represent, or they may have moved onto other sites. Users are left to map between database schema and real-world objects to the best of their ability.

If the average user is able to overcome these obstacles and retrieve data from several data sources, he must then combine the responses into a coherent solution set This compilation may involve conflict resolution among data rows. In some situations, it may be acceptable to return both data items and allow the user to decide which data item is more reliable. Consider however a fictitious military example. Two different databases return different locations for the same enemy tank. One location is very close to a US Army base, and the other set of coordinates places the tank much farther away. How should the Army General querying the system react? Should he or she assume the tank is close and ready the troops, and thus risk looking as if the base is preparing for military action? Or should the General not mobilize troops and risk being unprepared for an enemy attack? If the General does not know which data is more accurate in this case, then it is very difficult to determine which results are correct and what action to take.

In addition to the issues discussed in the previous section, attempting to locate relevant databases and achieve accurate query responses in a military environment can be even more difficult. For example, not only does the user need to gain access to a database, but he or she must typically have the appropriate clearance level to see every row and column of the data returned. An even bigger obstacle to overcome is the fact that terminology across branches of the military is not always consistent. First, the same term may have different meanings in different divisions of the military (e.g., rank has different meanings across government military components). Second, the same object (e.g., a 20-foot antenna or a type of ammunition) can have different names in different branches. The first issue leads to a problem in query interpretation while the second creates a problem in retrieving data across databases.

SUMMARY OF THE INVENTION

Accordingly, it is an object of the present invention to provide a system and methodology for querying distributed databases.

It is another object of the present invention to provide a query system and method adapted to process unstructured queries.

It is a further object of the present invention to provide a querying system and method which allows a user to retrieve data from a database as soon as such database is introduced into the system without causing the system to be halted or rebooted.

It is still another object of the present invention to provide a querying system and method which aids in the generation of mediators.

It is still another object of the present invention to provide a querying system and methodology which does not utilize a shared representation.

Generally, the system and method of the present invention accomplishes one or more of the above-noted objects of the present invention by providing an architecture which allows users to enter unstructured queries, expands and generalizes such queries, and matches the queries to actual target database tables. The method of the present invention generally includes the steps of processing a query (e.g., an unstructured query) to generalize and/or expand the query to return as many relevant words or terms as possible to the user, receiving from the user selected words or terms which the user expects to find in attributes of the distributed databases, and searching a database structure (e.g., an annotated database) having directories extracted from target distributed databases, the directories including table names, attribute names, sample data, and/or, if available, data dictionary information. Of importance, the step of searching the database structure includes utilizing a Lightweight Directory Access Protocol (LDAP), which allows quick access to information directories. Since LDAP directories are designed for reading data rather than updating or adding new data to the directories, the retrieval speed of information contained within the directories (e.g., table names and table attributes) is very fast.

In one aspect of the method of the present invention, the step of processing a query includes the step of receiving at least a first query from a user or client, the first query including at least a first term and the steps of identifying key terms and generalizing and/or expanding the first query to enhance the likelihood of retrieval of relevant data to the user. In this regard, the step of processing at least the first query may include the step of identifying or extracting key words or terms from the first query, such as the first term, since such key words may correspond to an attribute or table name in the target distributed databases. In one embodiment, the step of extracting key words includes the step of extracting at least a first noun and/or a first noun phrase from the first query. In another embodiment, the step of extracting key words comprises the step of extracting at least a first verb from the first query. In yet another embodiment, the step of extracting key words comprises the step of extracting at least a first data item (e.g., part number) in the first query. In order to further generalize the first query in order to enhance the chances of capturing relevant information from target databases, the step of processing at least the first query comprises the step of stemming at least a first term in the first query, such that at least a first root word corresponding to the first term may be utilized in the final search. The processing step may also include the step of generating at least a first synonym of at least the first term of the first unstructured query to expand the scope of the search. The step of processing at least the first query may be facilitated by presenting, to the user an initial user query screen, whereby the user is afforded an opportunity to perform various options, including perform stemming, include synonyms, include acronyms, and/or perform wild card substitutions.

Once such nouns, noun phrases, verbs, numbers, synonyms, acronyms, and/or related terms are retrieved and/or generated, the processing step may include the step of presenting such terms to the user in an expanded or refined user query screen format. Such relevant words (e.g., nouns, noun phrases, verbs, numbers, and/or synonyms) may be presented to the user or client to afford the user the opportunity to select the returned relevant terms (e.g., gathered nouns, noun phrases, synonyms, acronyms, data items and/or related items) which the user believes useful in searching the target distributed databases. As a result, the user is able to select or collect terms for which the database schema will be searched.

In order to facilitate subsequent searches by a user, the step of processing the first unstructured query from the user may further include the step of ranking selected relevant terms (e.g., synonyms or other related terms). In this regard, if a term is selected, the rank for such term is increased and, conversely, if a term is not selected, the rank for such term is decreased. Additionally, the methodology of the present invention is adapted to learn from the structure of the users' queries. In this regard, if query terms frequently occur together, when a user submits only one of these terms, information regarding both terms may be returned to the user to save the user time. Such learning capability may be included within the LDAP. Conversely, if certain synonyms are not frequently selected, such synonyms will not be returned to users in the future.

As noted hereinabove, the method generally includes the step of searching a database structure, such as an LDAP directory which may include attributes, table names, sample data and/or data dictionary information in the target distributed databases, for attributes and/or table names that match the terms selected by the user (e.g., augmented query terms) and presenting such information to the user. Such attributes and/or table names may be retrieved, along with the remaining attributes for tables that had matching attribute names. A first tree may be constructed, whereby query term folders are populated with database folders containing the tables that match the augmented query terms and such tree is presented or returned to the user. Such folders are labeled with the query term or terms that correspond to the matching tables contained in them. The methodology of the present invention may further include the step of processing a final query from the user. In one embodiment, the step of creating a final query comprises creating a pictorial query for the user, whereby the user is allowed to add constraints and/or joins to produce a final query. The step of processing the final query further includes the step of automatically generating SQL code corresponding to the final query and utilizing a mediator to forward the query to appropriate databases, receive data from each of the appropriate databases, and returning such data to a servlet, where such data is formatted and presented to the user.

In another aspect, the present invention relates to a system for processing at least a first query to retrieve data relevant to the first query from at least a first of a plurality of distributed or target databases. Generally, the system of the present invention includes a computer system for at least receiving a first query from a first user, an extractor for identifying key words, such as nouns, noun phrases, verbs or numbers in the first query, a database structure, such as an LDAP directory, including at least one of a plurality of table names and attributes relating to tables within the distributed databases, the directory being searchable to provide the user, via the computer system, with at least a first database table name and attributes associated with retrieved tables corresponding to the retrieved table names, and a code generator for generating SQL code based upon retrieved table names and/or attributes selected by the user. In order to enhance the search, the system may further include a query generalizer for processing the first query to provide or return to the user via the computer system terms related to at least a first term of the first query to enable the user to select terms the user expects to find in distributed database tables. For purposes of facilitating searching, the system may further include a learning program, whereby information about which synonyms a particular type of user will need and which terms often appear together in these queries is stored and/or ranked. In this regard, after the user enters a query and chooses relevant synonyms, the rank of terms is updated. If terms are selected, the rank of such terms is increased and conversely, if terms are not selected, the rank of such terms is decreased. Further, the system is adapted to learn from the structure of the users' queries. In this regard, if terms frequently occur together, then when the user asks only about one of these terms, the system will return information about those terms to the user. The system may further include a central mediator for receiving the query and SQL code, via any computer system, the central mediator in communication with the target distributed databases. Such central mediator may be adapted to return the retrieved data from the appropriate distributed databases to the computer system, which is capable of formatting and presenting such data to the user via, for example, a display screen.

DETAILED DESCRIPTION

Generally, the method and system of the present invention allows users or clients to enter an unstructured query that the system expands and generalizes and then matches to actual database tables. Users may interact with the system in three different ways. First, the users may enter an unstructured query, which may be a list of important terms as in a typical search query or, alternatively, the query may be a natural language question or sentence. Second, users may select the nouns, noun phrases, synonyms, and/or related terms that the user expects to appear in the table names and/or attribute or field names of the target databases. In this regard, after the unstructured query is received, nouns and/or noun phrases in the query may be identified, and the query may be generalized and/or expanded to return to the user as many relevant words as possible. From these returned words, the user may select the terms he or she expects to find in the database attributes and/or table names in the system. And third, the user may form Structured Query Language code ("SQL") by clicking on tables and attributes presented to the user. In this regard, the database matches that the system believes correspond to the query are presented to the user and given the tables, the user may form a pictorial query from which the SQL code is automatically generated. Thereafter, the data itself may be displayed to the user.

Figure 1:
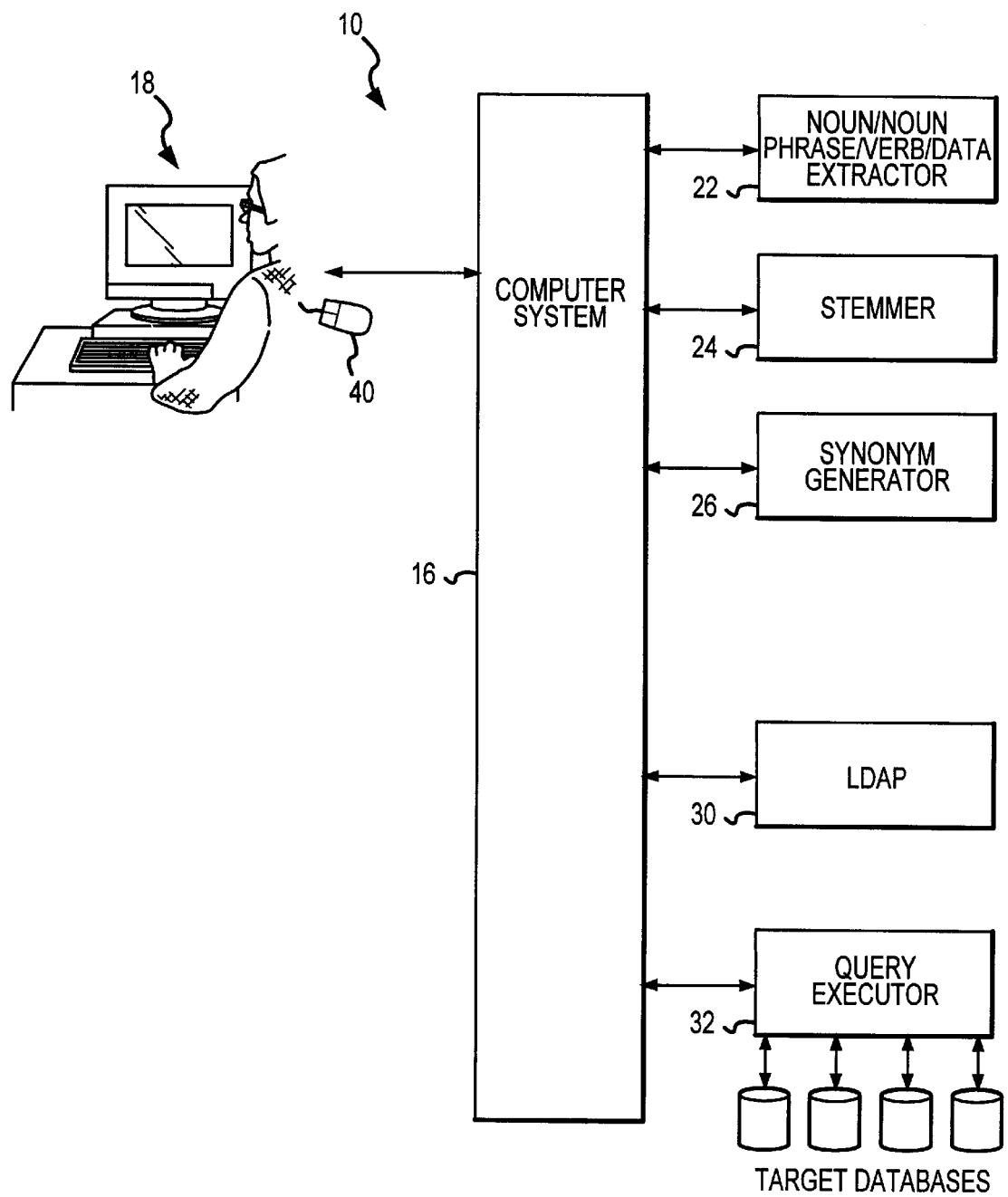
FIG. 1 is a diagrammatic illustration showing one embodiment of the system of the present invention.
Figure 2:
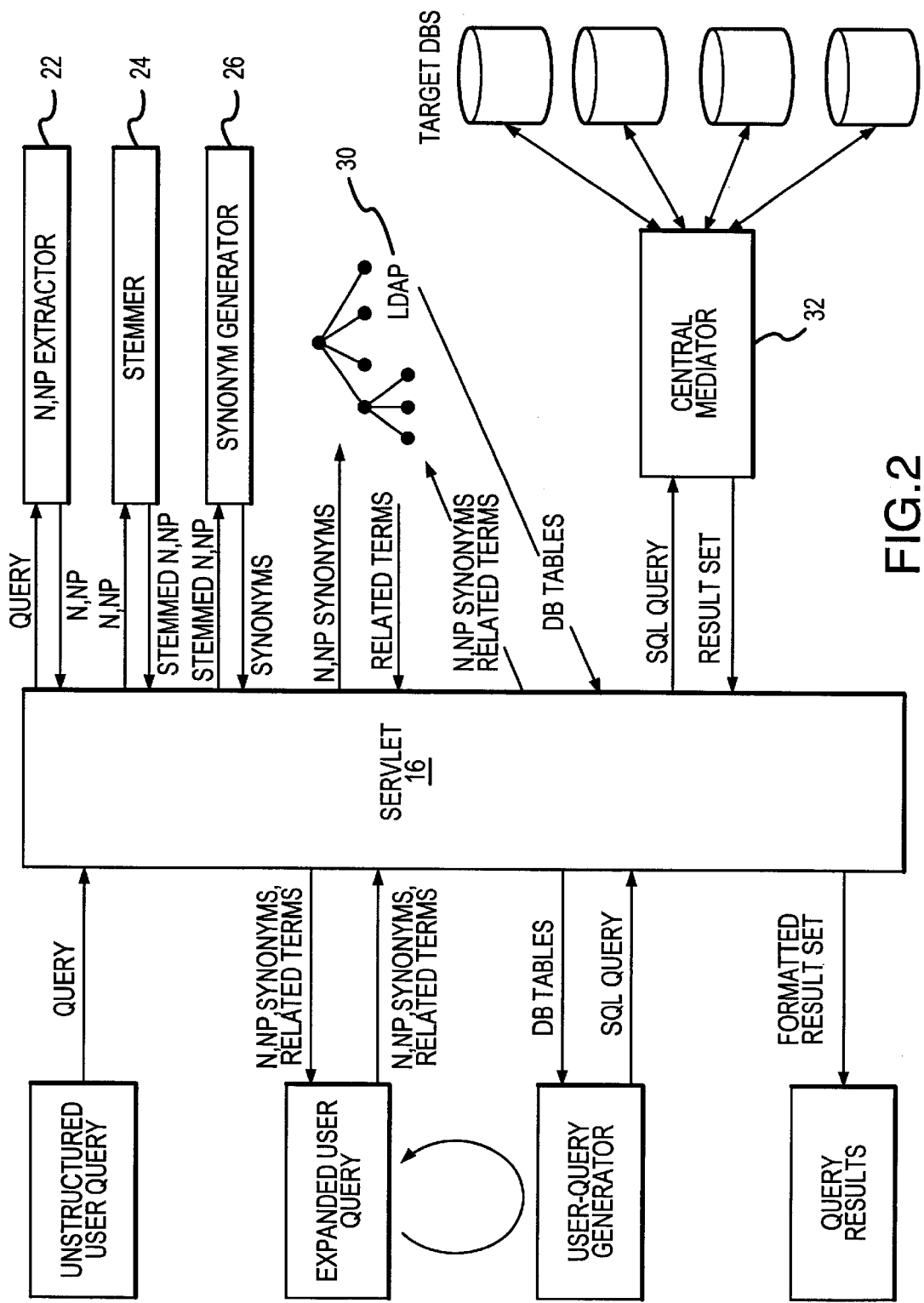
FIG. 2 is a diagrammatic illustration showing the architecture of the system illustrated in FIG. 1.

One embodiment of the system 10 of the present invention is illustrated in FIG. 1. The architecture associated with the system of the present invention is illustrated in FIG. 2. As noted hereinabove, the method first involves an interface with the user to allow the user to specify an initial query. The first step in the querying process begins with the user entering an initial query and ends with the systems returning nouns, noun phrases, verbs, data synonyms, and/or related terms. The purpose of this phase of the querying process is to identify key words of the query and to expand and/or generalize the initial query so that later in the process, as many correct tables as possible may be returned to the user. In particular, the system 10 of the present invention includes a computer system 16 (e.g., a servlet), which generally functions to receive and send data to the appropriate destination. In this embodiment, the computer system 16 is adapted to present the user with a query input screen 50, illustrated in FIG. 3, which is displayable to the user via a display screen 18, illustrated in FIG. 1. Such user query input screen 50 allows the user to enter an unstructured query in the query field 52, illustrated in FIG. 3. Via this user query input screen 50, the user may select which particular generalization and/or expansion functions should be utilized in expanding the query, such as perform stemming, include synonyms, include acronyms, perform wild card substitution and enable user assisted learning (to be described in more detail hereinbelow). In this regard, the system 10 also includes a noun/noun phrase extractor 22, a stemmer 24 and a synonym generator 26. The noun/noun phrase extractor 22, which is commercially available from various vendors, is adapted to identify important or key nouns and noun phrases in a user's query. In general, because of the way in which queries are phrased, the most important items in a user query are nouns, noun phrases, conditionals (e.g., greater than) and numbers. Thus the noun/noun phrase/verb/data extractor 22 searches for only nouns, noun phrases, verbs and data and returns to the user, via the computer system 16, a list of queryTerms (i.e., identified or extracted nouns/noun phrases/verbs/data). The stemmer 24 returns the base word for each queryTerm in the returned list. For example, the queryTerm "guns" would be turned into "gun" and "buyers" would be turned into "buy."

Figure 4:
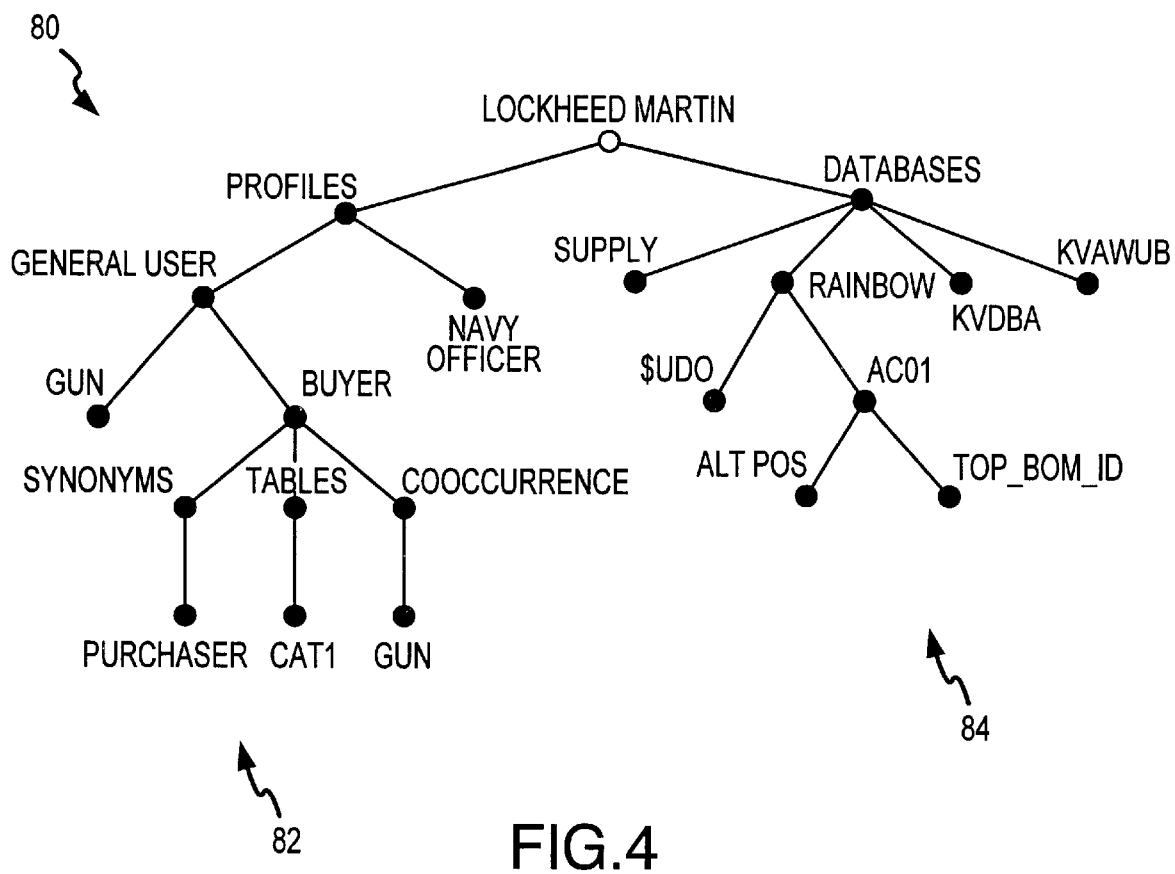
FIG. 4 illustrates the structure of a sample LDAP directory.

The system 10 is also adapted to expand each term by finding synonyms. In this regard, the synonym generator 26, which is commercially available as Princeton'sWordNet Lexicon, identifies synonyms for each queryTerm, and those synonyms whose rank is greater than the system threshold are collected and returned to the user. Initially, all terms are ranked at zero (0). As terms are returned and selected by the user, the rank of such selected terms increases. If returned terms are not selected by the user, the rank of such non-selected terms decreases. When the rank of such non-selected terms falls below the user-acceptability level, these terms are no longer returned to the user. In the event user assisted learning is enabled or desired by the user, related terms may be retrieved from the LDAP 30, such related terms being words that frequently occur in queries with a queryTerm. In this embodiment, the LDAP directory's learning branches, an example of which is illustrated in FIG. 4, may contain the most frequently co-occurring terms for every queryTerm. More specifically, as users query the system 10, the choices they make are used to learn what types of information should be returned to them in future queries. Initially, the system 10 knows nothing. All users have a blank slate, and all query responses are equally "good" answers. After users enter queries and choose relevant synonyms, the rank of terms is updated. If terms are selected, their rank is increased. Conversely, if terms are not selected, their rank is decreased. Only terms whose rank is greater than the system threshold are returned. Additionally, the system 10 is adapted to learn from the structure of the users' queries. If terms frequently occur together (e.g., gun and ammunition), then when the user asks only about one of these terms, the system 10 will return information about both. This saves the user time from having to add terms and resubmit the query since the information may be already provided. These co-occurrence terms also suggest related information to the user and thus expand users' queries. All this information is kept for each type of user so that different meanings across different entities (e.g., Department of Defense components) may be remembered. Once the nouns, noun phrases, verbs, data, synonyms and/or related terms are retrieved, they are formatted (e.g., by the computer system or servlet 16) into a Java Swing class component that allows data to be displayed in a tree format (called a DefaultMutable Tree) and sent to the expanded user query screen, illustrated in FIG. 5, which is displayable to the user via display device 18.

Figure 5:
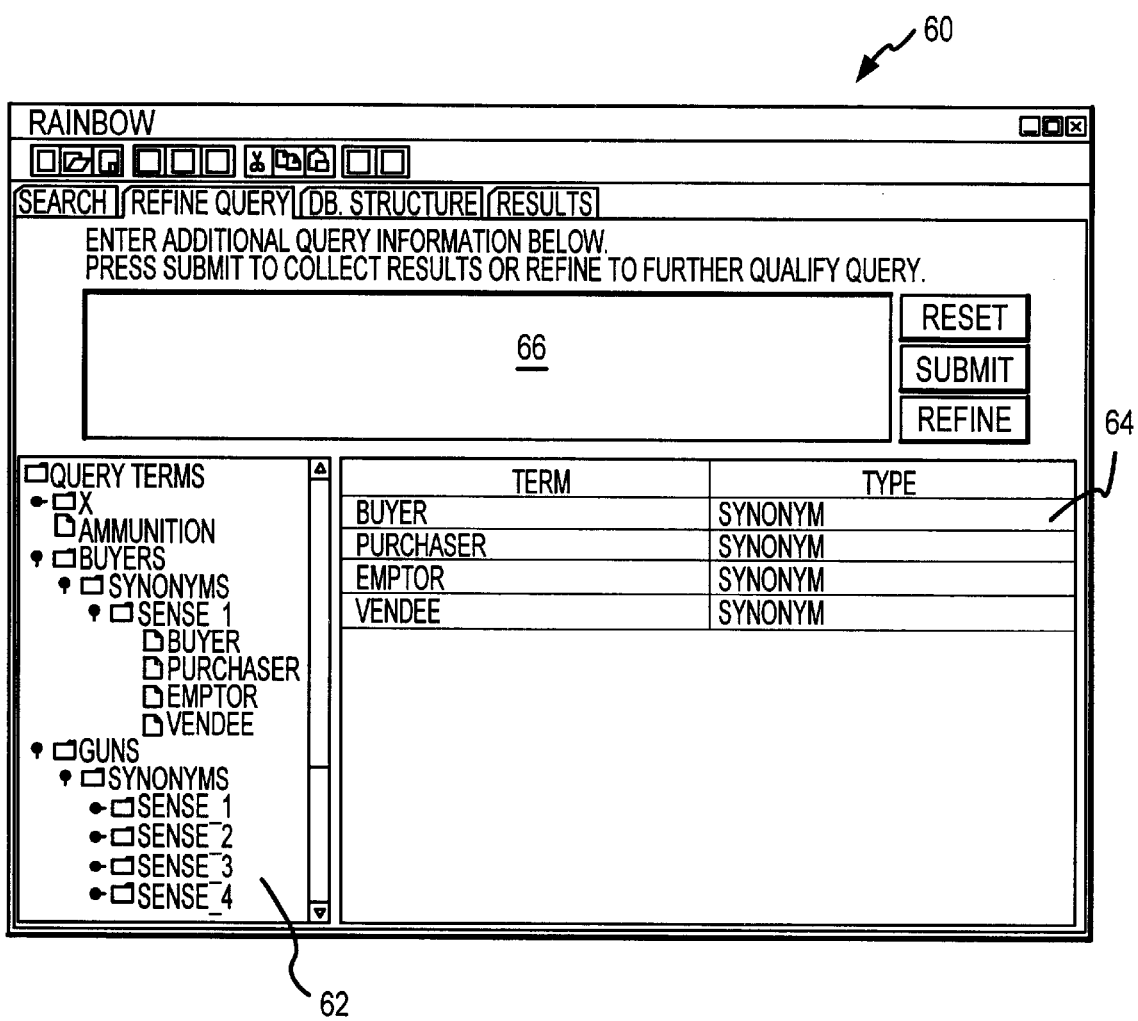
FIG. 5 illustrates a view of displayed textual and graphic information related to expanding a user's query via the screen.

FIG. 5 illustrates the expanded user query screen 60 which contains the nouns, noun phrases, synonyms and/or related terms which have been retrieved and displayed in a tree format in a left-hand area 62 of the screen. In this expanded user query screen 60, users can open folders, revealing synonyms and related terms associated with different queryTerms. The right-hand area 64 of the screen serves as an area to collect terms for which the system's database schema will be searched. Users may add individual terms or entire folders in the left-hand area 62 to the right-hand side of the screen. The items in that area 64 will be searched for in the attribute names of the target databases. Additionally, users may enter new queries in the Query box 66 and may either choose to expand and generalize these terms and return to the screen to continue adding terms to the right-hand side 64 (Refine), or may choose to Submit the query. If Refine is chosen, the steps discussed hereinabove relating to generalization and expansion of the query are followed, and the new tree of terms, synonyms, and related terms is sent to the user. However, if Submit is selected, the terms in the Query box 66 are expanded and generalized as above, and the intermediate tree is not displayed to the user. Instead, all nouns and noun phrases, verbs, data, synonyms and/or related terms are appended to the list of terms retrieved on the right-hand area 64 of the expanded user query screen 60, illustrated in FIG. 5. Once the user submits these queryTerms, wild cards may be added to the beginning and end of each term, and spaces are replaced with wild cards (if the queryTerm is a noun phrase). Thereafter, the LDAP structure 30, illustrated in FIG. 1, may be searched, and all attributes in the target databases that match the augmented queryTerm are returned. The system retrieves the rest of the attributes for the tables that had matching attribute names, and a tree is constructed where queryTerm folders are populated with database folders containing the tables that match. This tree is then returned to the user via the computer system or servlet 16 as the query generating screen 70, illustrated in FIG. 6.

Of importance, the LDAP protocol allows quick access to the information in its directories, and provides capabilities allowing greater expression searches. Because LDAP directories are designed for reading data rather than updating or adding new data to the directories, the retrieval speed is fast. A sample LDAP structure 80 is illustrated in FIG. 4. The left half 82 of the LDAP hierarchy holds data used in the learning algorithm (e.g., for retrieval of related terms and/or synonyms). Data in these branches is associated with specific types of users (e.g., general users, Navy officers, etc.). The right half 84 of the tree contains details about databases contained in the system. For each database, all tables, attributes, attribute data types, and whether or not the attribute is a key is stored. The speed of the LDAP search a coupled with the regular expression querying capability, is the primary driver for storing both database structure and learning information in the LDAP. As note hereinabove, the directory tree has two halves, a learning half and a database half. In the learning half 82, information is stored about which synonyms a particular type of user will need and which terms often occur together in these queries. In the database half 84 of the tree, the structures of all the databases in the system are stored. In this embodiment, there are four databases in the system: SUPPLY, Rainbow, KIVDBA, and KVAWUB. Such databases may be extracted from structure databases (e.g., Oracle), or any other similar database.

Figure 7:
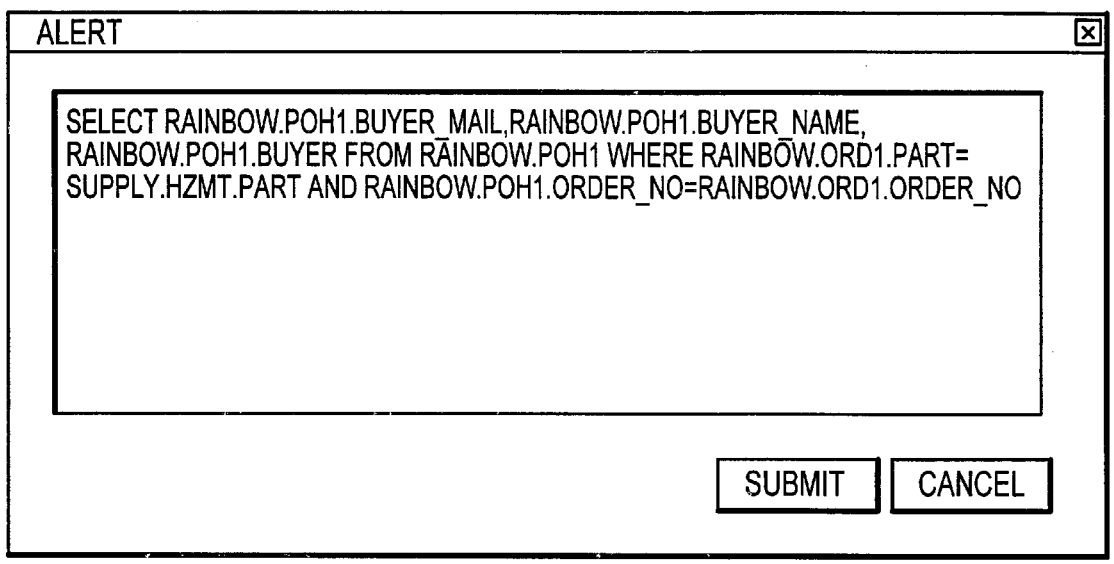
FIG. 7 illustrates a sample SQL query.

The third general step in the querying process is directed to creating a final query. More specifically, this phase of the querying process allows users to create a pictorial query and add constraints, view the automatically generated SQL code, submit the query, and browse the resulting data set. As noted hereinabove, the system 10 illustrated in FIG. 1 is adapted to construct a tree whereby queryTerm folders are populated with database folders containing the tables that match. Once the suggested tables are returned to the user via the query generating screen 70, the user may select tables from the left-hand area 72 of the query generating screen 70, adding them to the right-hand work area 74. As the tables 76a, 76b are added, keys or attributes that match between tables are automatically connected with lines (e.g., joins 78), both of which may be deleted by the user, if desired. The system is adapted to allow users to create further joins by clicking arid dragging a mouse 40, illustrated in FIG. 1, between attributes in different tables. Users may also add constraints on a specific attribute by clicking the attribute so that it appears in the bottom portion 79 of the screen, then filling in the rest of the constraint. Once the query is built by the servlet 16, the user may view the SQL code in another screen presentable to the user (an example of which is illustrated in FIG. 7, and press or select the submit option. The servlet 16 then passes the query to a query executor 32 (e.g., mediator) which is commercially available from a variety of vendors, the mediator being adapted to retrieve data from the specified databases in accordance with the SQL code. The data retrieved are then returned to the servlet 16, where the data is formatted and presented to the user via the display device 18. In this embodiment, the query executor or mediator, in accordance with the SQL code, is directed to retrieve only data from particular databases, tables and attributes, in view of the joins and constraints, if any. No mappings between databases are created.

Figure 8A:
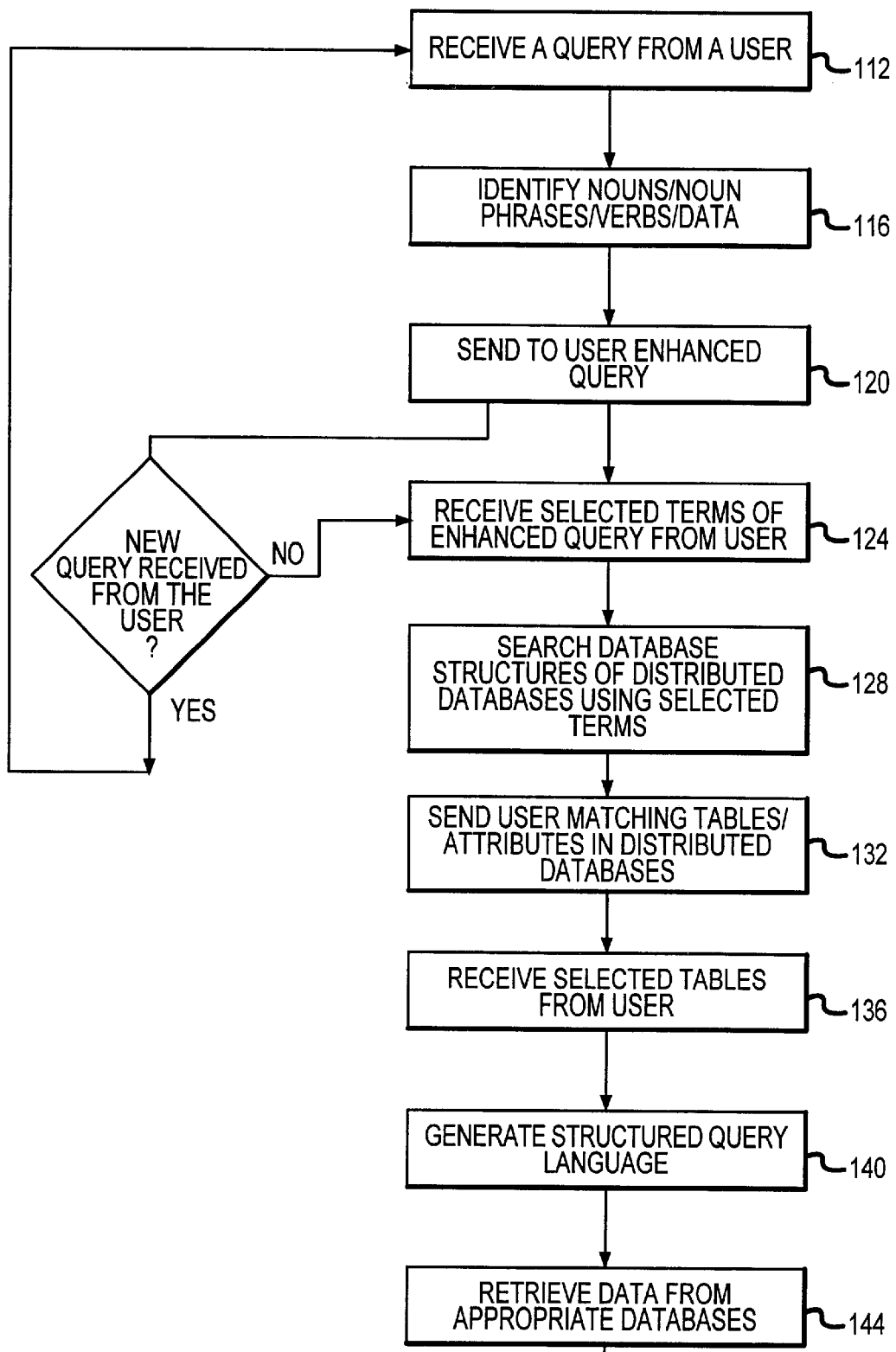
FIGS. 8A–8B present a flow chart of one embodiment of the method of the present invention.
Figure 8B:
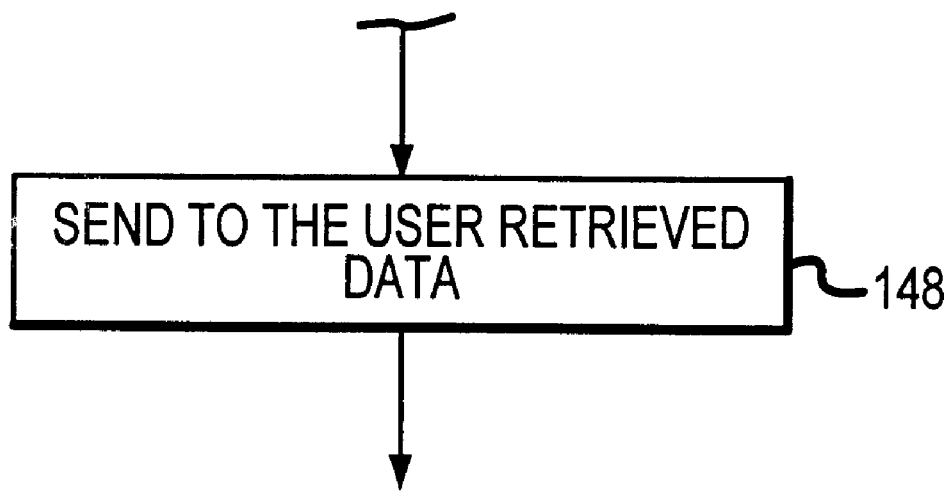
Figure 9A:
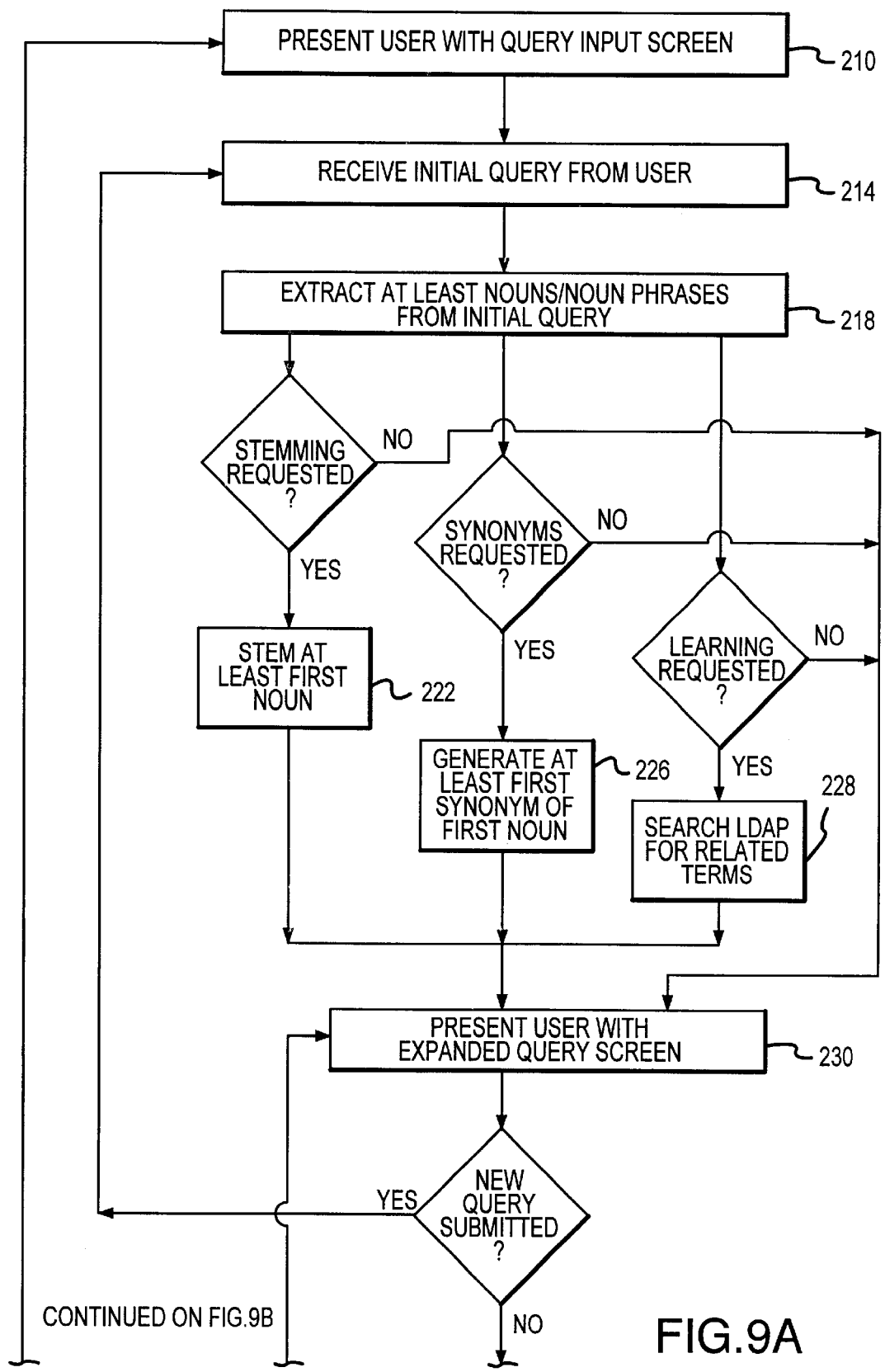
FIGS. 9A–9D present a flow chart of another embodiment of the method of the present invention.
Figure 9B:
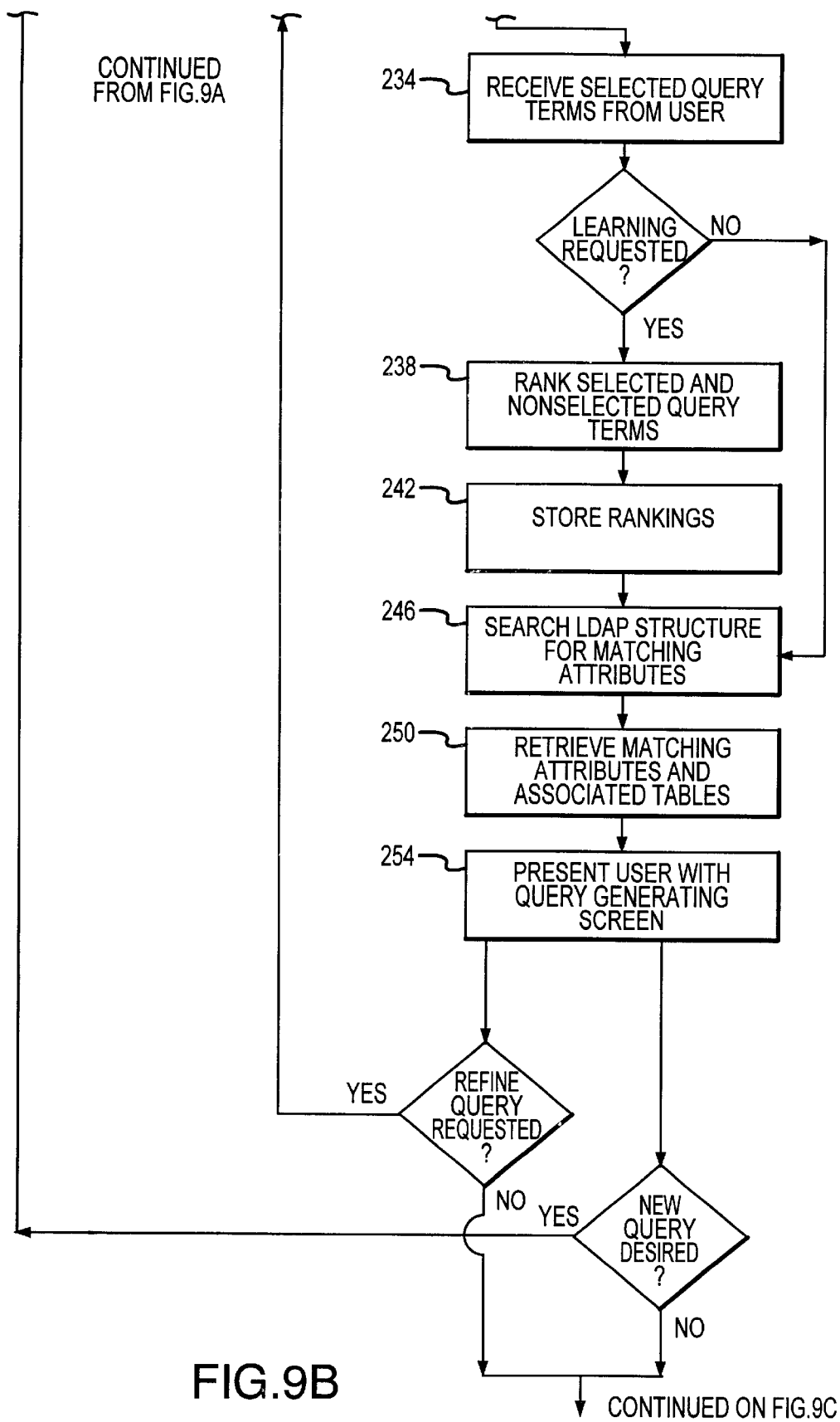
Figure 9C:
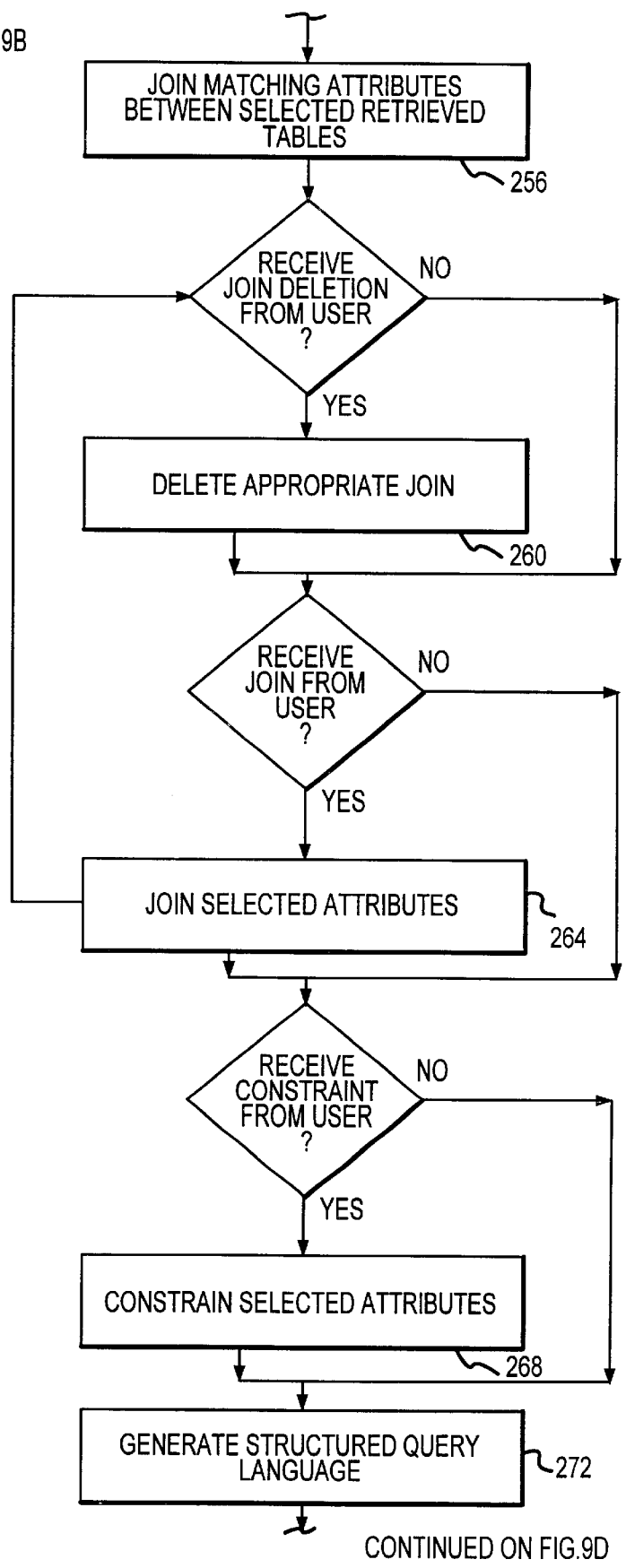
Figure 9D:
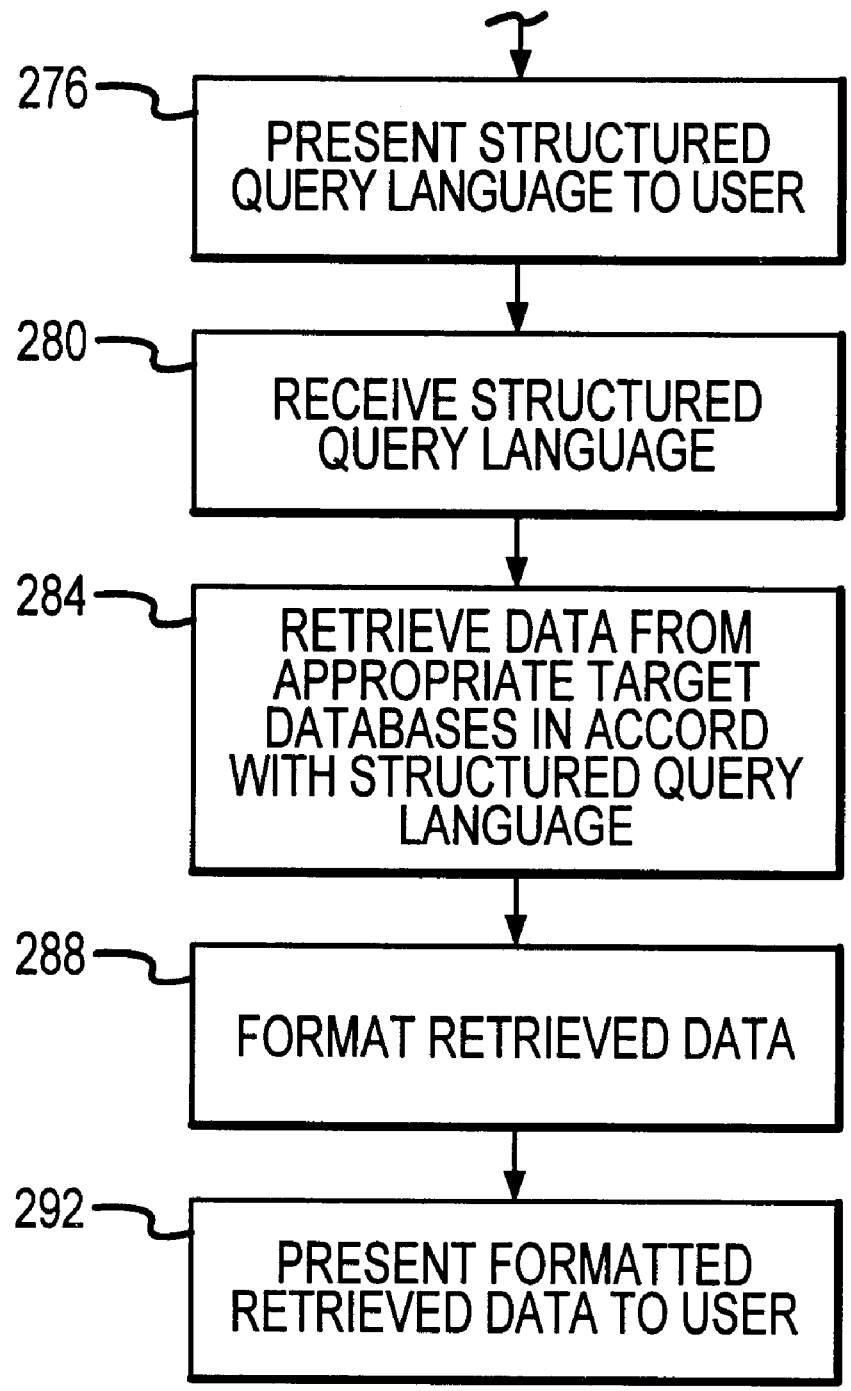

In another aspect, the present invention is directed to a method for querying distributed databases. Generally, and referring to FIGS. 8A–8B, in this embodiment, the method of present invention includes a step 112 of receiving from a user a query (e.g., structured query or unstructured query). Thereafter, the method includes a step 116 of identifying/extracting nouns, noun phrases, verbs and/or data from the query. Thereafter, the methodology includes a step 120 of sending to the user the enhanced query, at which point the user may select terms which will be searched for any attribute names of the target databases. Users are also afforded the opportunity to enter new queries. In this regard, in the event a new query is received from the user, the new query may be received and then processed as described herein-above. Otherwise, the method includes the step 124 of receiving the selected terms of the enhanced query from the user. Thereafter, the method includes the step 128 of searching the database structure (e.g., LDAP structure) to retrieve all attributes in the target databases that match the terms of the enhanced query selected by the user. The method then includes the step of retrieving the rest of the attributes for the tables that had matching attribute names and the step 132 of sending to the user matching tables in the distributed databases. At this point, the method of the present invention allows the user to create a pictorial query and to add constraints. In this regard, the method includes the step 136 of receiving selected tables from the user corresponding to the table from which the user wishes data to be retrieved from the system databases. Upon receipt of such selected tables from the user, the method includes the step 140 of generating an SQL code and the step 144 of retrieving data from the appropriate target databases and the step 148 of sending the retrieved data to the user.

Figure 3:
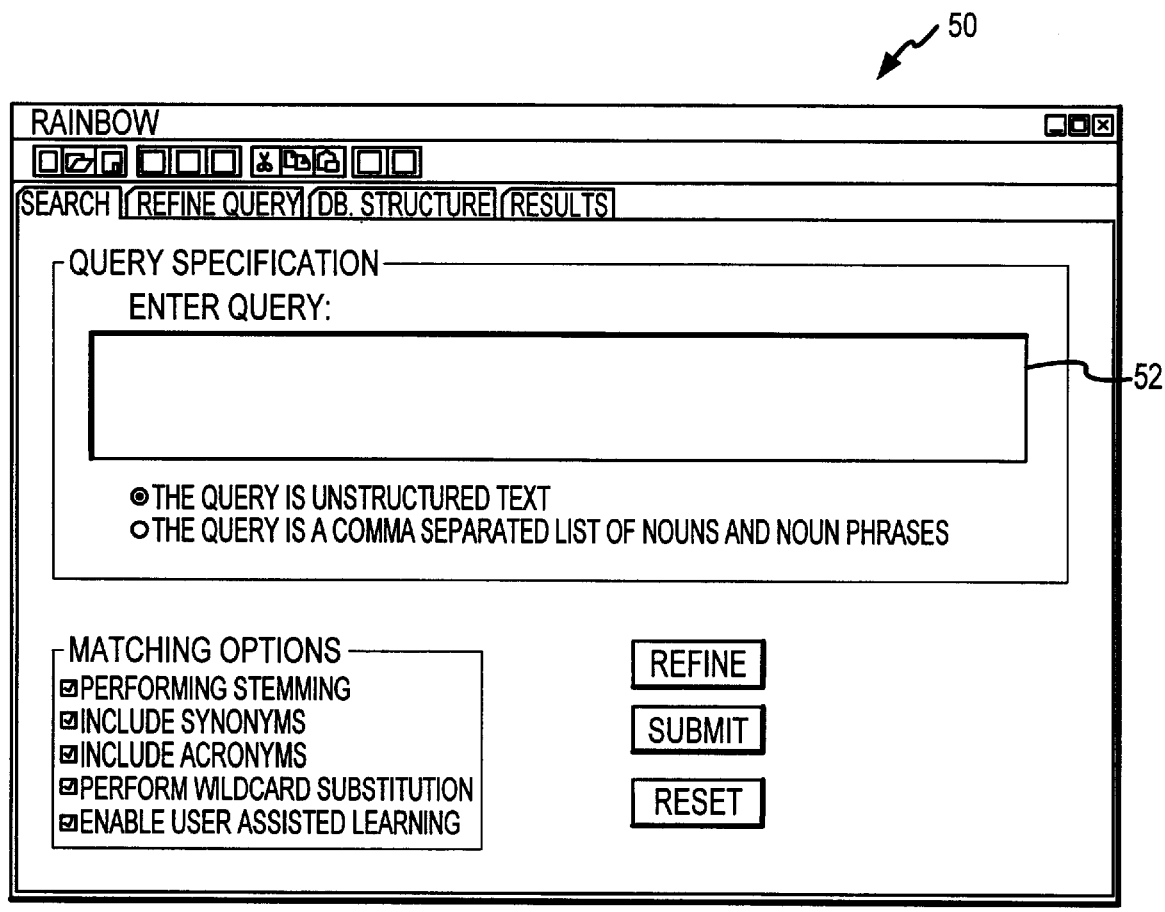
FIG. 3 illustrates a view of displayed textual and graphic information related to entering a query via the screen.

Another embodiment of the methodology of the present invention is illustrated in FIGS. 9A–9D. Initially, the methodology includes the step 210 of presenting the user with a query input screen, which is illustrated in FIG. 3. As noted hereinabove, the query input screen presents the user with an area to enter the query, and gives the user several options, such as whether to perform stemming, include synonyms, include acronyms, perform wild card substitutions, and enable user assisted learning. In this regard, the method further includes the step 214 of receiving the initial query from the user and the step 218 of extracting nouns and/or noun phrases from the initial query, such extracted nouns/noun phrases identified as "queryTerms". In the event the user has requested stemming to be performed, at least a first noun in the initial query or a first queryTerm is stemmed (step 222), and in the event the user has requested synonyms be included, the method may further include the step 226 of generating at least a first synonym relating to the first noun or first queryTerm. In the event the user assisted learning has been enabled or requested by the user, the method includes the step 228 of retrieving related terms from the LDAP, a related term being a word that frequently occurs in queries with a queryTerm.

Once the nouns, noun phrases, verbs, data, synonyms and/or related terms are retrieved, the method further includes the step 230 of presenting such terms to the user in an expanded user query screen, illustrated in FIG. 5. As noted hereinabove, the expanded user query screen allows the user to specify which synonyms and/or related terms correspond to the query. In this regard, the method further includes the step 234 of receiving stem terms, related terms and/or synonyms selected by the user. The method then includes a step 138 of ranking the selected and non-selected terms or words and the step 142 of storing the rank of such terms and the related terms for future use (as described hereinabove). Utilizing the queryTerms selected by the user, the method includes the step 246 of searching the LDAP for matching attributes and the step 250 of retrieving the matching attributes and associated table names.

Figure 6:
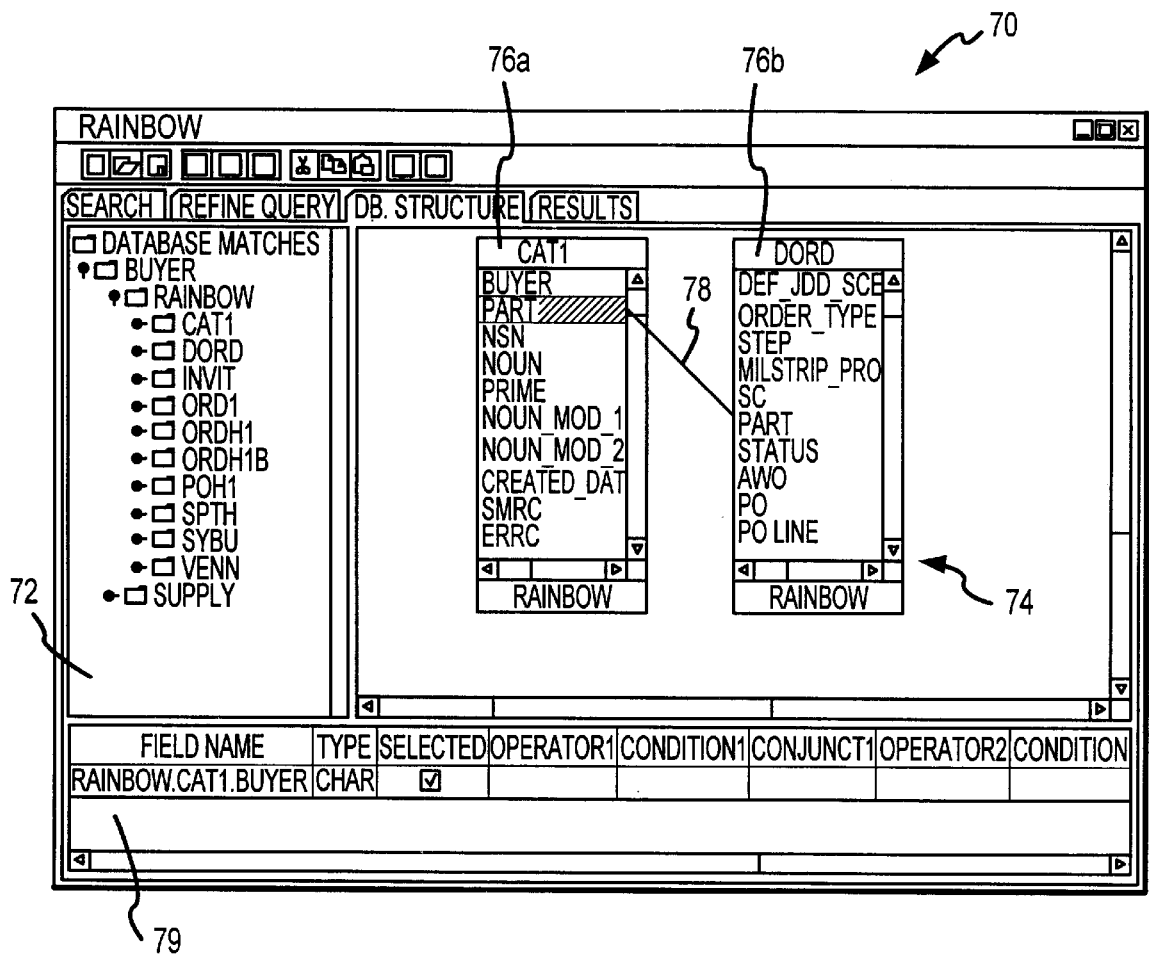
FIG. 6 illustrates a view of displayed textual and graphic information related to finalizing a user's query via the screen.

The method then includes the step 254 of presenting to the user a query generating screen, illustrated in FIG. 6. This phase of the querying process allows users to create a pictorial query, add constraints, view the automatically generated SQL code, submit the query and browse the resulting data set. As noted hereinabove, the query generating screen illustrated in FIG. 6 presents to the user the suggested returned tables, from which the user may select by adding selected tables to the right-hand work area from the left-hand side of the screen. It should be noted that in the event the user is not satisfied with the presented/retrieved tables, the user may elect to refine the query, whereby the user will be presented with the expanded query screen, illustrated in FIG. 5, or, alternatively, the user may submit a new query by going back to the user query input screen. In the event the user wishes to continue, the method further includes the step 256 of joining matching attributes between selected retrieved tables. In the event the user does not wish to proceed with the query utilizing one or more of the automatically joined matching attributes, the method includes the step 260 of deleting appropriate joins, as selected by the user. The user may also add joins manually by clicking and dragging the mouse between attributes in different tables. In this regard, the method may further include the step 264 of joining selected attributes, as selected by the user. The method of the present invention further allows constraints to be added on specific attributes by clicking the attribute so that it appears in the bottom portion of the query generating screen, and allowing the user to fill in the constraint. In this regard, the method includes the step 268 of constraining selected attributes in accordance with the user's request. Thereafter, the method includes the step 272 of generating an SQL query based upon the selected tables, constraints and joins. Such SQL code may be presented to the user at step 276. Once the query is built, the user may view the SQL code and submit the query to the servlet, which passes the query to the mediator which is adapted to retrieving data from the specified databases in accordance with the SQL query. In this regard, the method includes the step 280 of receiving the SQL query, the step 284 of retrieving data from the appropriate target databases in accordance with the SQL query, the step 288 of formatting retrieved data and finally, the step 292 of presenting the formatted retrieved data to the user.

As a result, the present invention is particularly useful in aiding users in accessing data from distributed, structured databases, whereby users need not know the structure or even the existence of the databases needed to complete their queries. When querying the system, users need not know of the existence of relevant data sources currently available in the system, need not understand the schema of the databases, need not know SQL, and are not limited to formatting queries using drop-down menus. Rather, users may enter an unstructured query, select from synonyms and related terms automatically generated by the system to expand the user's initial query, and then generate a pictorial query using database tables the querying system suggests as relevant. After forming and submitting this query, users are presented with the corresponding data from actual databases.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A method of obtaining information from a plurality of distributed databases, comprising the steps of:
   receiving a first query from a first user;
   processing the first query to identify a plurality of key terms in the first query, the plurality of key terms comprising at least one of a first noun and a first noun phrase;
   displaying to the first user an expanded query including at least a plurality of returned key terms;
   receiving from the first user a plurality of select key terms, the plurality of select key terms being selected from the plurality of returned key terms by the first user;
   processing the select key terms to retrieve a plurality of attributes and a plurality of table names, wherein the plurality of attributes corresponds to the plurality of table names, wherein the plurality of table names correspond to a plurality of tables in the plurality of distributed databases;
   displaying to the first user the plurality of table names and the plurality of attributes;
   receiving from the first user a final query, the final query including a plurality of select tables, the plurality of select tables being selected from the plurality of table names by the first user;
   processing the final query to generate a first SQL query corresponding to the final query; and
   returning to the first user a first data result set based on the first SQL query.

2. A method as claimed in claim 1, wherein the first query is an unstructured query.

3. A method as claimed in claim 1, wherein said step of processing the first query comprises the step of stemming a first of the plurality of key terms.

4. A method as claimed in claim 1, wherein the step of processing the first query comprises the step of: identifying at least one of a first verb and a first data item within the first query.

5. A method as claimed in claim 1, wherein said step of processing the first query comprises the step of identifying at least a first synonym of a first of the plurality of key terms.

6. A method as claimed in claim 1, further comprising the steps of:
   ranking at least each of the plurality of select key terms to produce a rank of terms; and,
   storing the rank of terms for the first user.

7. A method as claimed in claim 1, wherein the step of processing the first query comprises the stop of stemming a first of the plurality of key terms.

8. A method as claimed in claim 7, wherein the step of processing the first query filter comprises the step of identifying at least a first synonym of a first of the plurality of key terms.

9. A method as claimed in claim 7 further comprising the steps of;
   ranking at least each of the plurality of selected key terms to produce a rank of terms; and
   storing the rank of terms for the first user.

10. A method as claimed in claim 1, wherein the step of processing the first query further comprises the steps of:
    identifying at least one of a verb and a first data item within the first query; and
    identifying at least a first synonym for a first of the plurality of key terms.

11. A method as claimed in claim 10, wherein the step of processing the first query further comprises the step of stemming a first of the plurality of key terms.

12. A method as claimed in claim 10, further comprising the step(s) of;
   ranking at least each of the plurality of selected key terms to produce a rank of terms; and
   storing the rank of terms for the first user.

13. A method as claimed in claim 1, wherein said step of processing the selected key terms comprises the step of using the selected key terms to search the plurality of distributed databases.

* * * * *

UNITED STATES PATENT AND TRADEMARK OFFICE
CERTIFICATE OF CORRECTION

PATENT NO. : 6,523,028 B1
DATED : February 18, 2003
INVENTOR(S) : Didomizio et al.

It is certified that error appears in the above-identified patent and that said Letters Patent is hereby corrected as shown below:

Title page,
Item [73], delete "Lockhead", and insert therefor -- Lockheed --;
Item [73], insert:

-- Wesley W. Chu and Hua Yang; CoBase: A Cooperative Query Answering Facility for Database Systems; Date Unknown.
M.W. Bright, A.R. Hurson and S. Pakzad; Automated Resolution of Semantic Heterogeneity in Multidatabases; ACM Transactions on Database Systems; Vol. 19, No. 2, June 1994, Pages 212-253.
Bipin C. Desai and Richard Pollock; On Schema Integration in a Heterogeneous Distributed Database Management System; IEEE 1989.
P. Buneman, S.B. Davidson, K. Hart, C. Overton and L. Wong; A Data Transformation System for Biological Data Sources; 21st VLDB Conference; 1995.
Daniela Florescu, Daphne Koller and Alon Levy; Using Probabilistic Information in Data Integration; 23RD VLDB Conference 1997.
Thomas R. Gruber; A Translation Approach to Portable Ontology Specifications; Date Unknown.
Ronald Foss and Robert Haleen; An Environment for Metadata Engineering; Date Unknown.
Gio Wiederhold; Mediators in the Architecture of Future Information Systems; IEEE 1992.
Narinder Singh; Unifying Heterogeneous Information Models; Communications of the ACM May 1998; Vol. 41, No. 5.
Wesley W. Chu and Kuorong Chiang; Abstraction of High Level Concepts from Numerical Values in Databases; AIAA Workshop on Knowledge Discovery in Databases; 1993.
Matthew Merzbacher and Wesley W. Chu; Pattern-Based Clustering for Database Attribute Values; AAAI Workshop in Knowledge Discovery in Databases; 1993.
Author Unknown; White Paper: Infresco Corporation's Opal and the Future of Enterprise Information Technology; 1997.
Jinxi Zu and W. Bruce Croft; Corpus-Based Stemming Using Co-Occurrence of Word Variants; Date Unknown.
Ward R. Turtle and W. Bruce Croft; Comparison of Text Retrieval Models; The Computer Journal; Vol. 35, No. 3; 1992.
Kyle Hart and Limsoon Wong; A Query Interface for Heterogeneous Biological Data Sources; February 28, 1994.
Adam Farquhar, Richard Fikes, Wanda Pratt and James Rice; Collaborative Ontology Construction for Information Integration; Knowledge Systems Laboratory Report No. KSL 95-63; August 1995.
Yoshiharu Ishikawa, Ravishankar Subramanya, Cristos Faloutos; MindReader:Querying Databases Through Mulitple Examples; April 1998.
Tom Mitchell; Does Machine Learning Really Work?; AI Magazine; Fall 1997.
Author Unknown; Wrapping and Characterizing Data Sources, Technical Session Report; Date Unknown.
Jide B. Odubiyi, David J. Kocur, Stuart M. Weinstein, Nagi Wakim, Sadanand Srivastava, Chris Gokey and JoAnna Graham; SAIRE - A Scalable Agent-Based Information Retrieval Engine; Autonomous Agents 97; 1997 ACM; Pages 292-299.
Alon Y. Levy, Anand Rajaraman and Joann J. Ordille; Querying Heterogeneous Information Sources Using Source Descriptions; Proceedings of the 22nd VLDB Conference; 1996.
Wang Chiew Tan, Ke Wang and Limsoon Wong; QUICK: Graphical User Interface to Multiple Databases; IEEE 1996; Pages 404-409.

UNITED STATES PATENT AND TRADEMARK OFFICE
CERTIFICATE OF CORRECTION

PATENT NO. : 6,523,028 B1
DATED : February 18, 2003
INVENTOR(S) : Didomizio et al.

It is certified that error appears in the above-identified patent and that said Letters Patent is hereby corrected as shown below:

Column 12,
Line 50, delete the word "stop", and insert therefor -- step --.

Signed and Sealed this

Seventeenth Day of June, 2003

JAMES E. ROGAN
*Director of the United States Patent and Trademark Office*